United States Patent [19]

Hirano et al.

[11] Patent Number: 4,935,912
[45] Date of Patent: Jun. 19, 1990

[54] CIRCUIT FOR DIGITALLY GENERATING A TRACKING ERROR SIGNAL TO AVOID OFFSET MONITORING

[75] Inventors: Hiroyuki Hirano; Akira Motoyama, both of Saitama, Japan

[73] Assignee: Pioneer Electronic Corporation, Tokyo, Japan

[21] Appl. No.: 197,240

[22] Filed: May 23, 1988

[30] Foreign Application Priority Data

May 21, 1987 [JP] Japan ................. 62-125337

[51] Int. Cl.⁵ .............................. G11B 7/09
[52] U.S. Cl. .................. 369/44.11; 369/54; 250/201.5
[58] Field of Search ............ 360/70, 77.05, 77.06, 360/77.07, 77.08, 77.11, 77.12; 369/43-44, 45, 46, 106, 124, 54; 250/201, 202; 318/569, 576, 600, 601, 577

[56] References Cited

U.S. PATENT DOCUMENTS

| 4,234,837 | 11/1980 | Winslow | 318/576 X |
| 4,236,105 | 11/1980 | Wilkinson |  |
| 4,305,123 | 12/1981 | Scibor-Rylski | 318/601 X |
| 4,396,832 | 8/1983 | Henderson | 318/577 X |
| 4,408,314 | 10/1983 | Yokota |  |
| 4,568,887 | 2/1986 | Bierhoff | 369/44 X |
| 4,611,315 | 9/1986 | Ogino | 369/44 X |
| 4,674,076 | 6/1987 | Hsieh et al. | 369/44 X |
| 4,740,940 | 4/1988 | Tanaka et al. | 369/44 |
| 4,748,609 | 5/1988 | Yonezawa et al. | 369/44 |
| 4,785,442 | 11/1988 | Ohtake et al. | 369/44 |
| 4,851,750 | 7/1989 | Yamazaki | 318/576 |

FOREIGN PATENT DOCUMENTS 3620301 1/1987 Fed. Rep. of Germany .
2124802 2/1984 United Kingdom .

Primary Examiner—Vincent P. Canney
Assistant Examiner—W. R. Young
Attorney, Agent, or Firm—Sughrue, Mion, Zinn, Macpeak & Seas

[57] ABSTRACT

A circuit for computing a tracking error signal digitally. Under control of appropriate timing, input RF signals are latched in successive latches, and outputs of the latches are compared. The latch (9) whose output is D/A converted as a tracking error signal is controlled by suitable logic (25) to latch an output of a preceding latch (8), that output being used to provide input to the logic (25) through a threshold circuitry which includes adders (21,22) and comparators (14,15). The circuit takes advantage of servo patterns on surfaces of disks, particularly optical disks, to provide track count and on-track status. The digital approach removes the necessity for using capacitors or other types of sample-and-hold circuitry, and for controlling offset values.

5 Claims, 2 Drawing Sheets

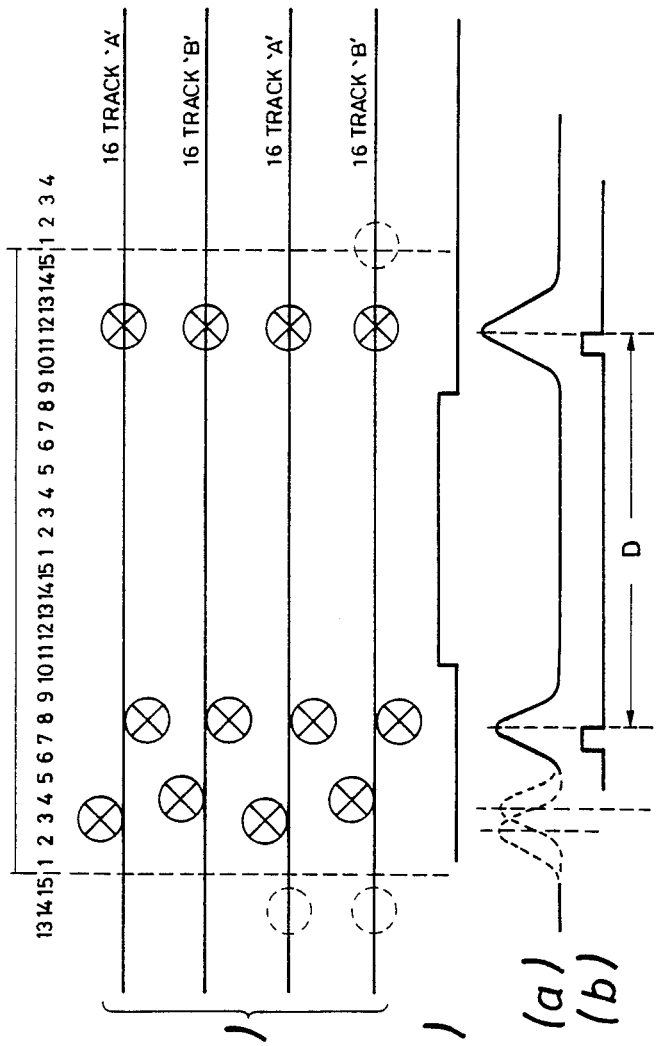

CIRCUIT FOR DIGITALLY GENERATING A TRACKING ERROR SIGNAL TO AVOID OFFSET MONITORING

BACKGROUND OF THE INVENTION

The invention relates to a tracking error signal generating circuit suitably used in an optical disk device, in which an RF signal is latched at a predetermined timing after it is subjected to A/D conversion to generate a digital tracking error signal.

FIG. 2A shows a servo byte pattern of a sample servo formed on an optical disk. An optical disk surface is divided into sectors, each sector of the optical disk containing, for example, forty-three (43) servo blocks. A servo block contains a two-byte servo portion and a 16-byte data portion subsequent thereto. Each byte has 15 bit positions. The two-byte servo portion is clearly shown in FIG. 2A. part (a). for four tracks. The first byte of the servo portion contains of two wobbled pits. The first wobbled pit is located at either the third or the fourth channel bit position. The second wobbled pit is located at the eighth channel bit position. The second byte of the servo portion contains one clock pit which is located at the twelfth channel bit position. The wobbled pits are arranged to the left and right of a track centerline.

When a pickup (a light spot for detecting information) accurately follows the track center, the intensities of reflected light from the left and right wobbled pits are equal to each other. When the pickup deviates to the left or right, away from the track center, the light intensities from the two wobbled pits change, depending on the direction and the amount of the deviation. As a result, based on the difference between the decreased values at two positions (or a level difference of RF signal, as shown in FIG. 2B. waveform (a)). a tracking error signal is produced and is held during a region of the data byte in which the tracking error signal continues.

The first wobbled pit in the first byte of the servo portion is changed every 16 tracks, from the third channel bit to the fourth channel bit, or vice versa. As a result, the interval between the two wobbled pits in the first servo byte in each servo portion is alternately longer and shorter every 16 tracks. Detecting the change in the interval makes it possible to count (within sixteen tracks) the number of the tracks even when data is searched at high speed.

The distance between the second wobbled pit (the eighth channel bit in the first byte of the servo portion) and the clock pit (the twelfth bit in the second byte of the servo portion) is set to be a special length D which is not used in the data portion. As a result, this distance D can be detected as a synchronizing signal. Various timing signals are generated based on the detected synchronization signal. The clock (FIG. 2B. waveform (b)) is generated in correspondence with the detected clock pit signal.

A mirror surface portion of the distance D is used as a focus sample area (FIG. 2A, waveform (b)). The focus error signal is sampled from that area and held for a period corresponding to the area of the following data byte. During the period corresponding to the passage of the data byte area past the pickup following the servo byte area, data is recorded by pits or with phase variation.

Because the conventional apparatus generates tracking error signals and the like utilizing an analog switch, a sample-and-hold circuit and the like, it is necessary to control the offset.

SUMMARY OF THE INVENTION

In view of the foregoing deficiencies, according to the present invention, there is no need for monitoring of offset and the like, since the tracking error signal is digitally generated.

In accordance with the operation of the present invention, an RF signal is inputted to an A/D converter and is A/D converted. The outputs of the A/D converter are inputted to first to third latch circuits and are respectively latched in accordance with first to third timing signals outputted from a timing signal generating circuit. The outputs of the first latch circuit and the second latch circuit are compared with each other in the first comparator and the comparison result is latched in the fourth latch circuit. The selector circuit selects outputs of the first latch circuit or the second latch circuit in correspondence with the output of the fourth latch circuit. The output of the selector circuit is latched in the fifth latch circuit with the third timing signal. The difference between the outputs of the third latch circuit and the fifth latch circuit is calculated by means of a subtraction circuit, and outputs of the subtraction circuit are latched in the sixth latch circuit. The output of the sixth latch circuit is latched in the seventh latch circuit also. A predetermined value is added to the output of the seventh latch circuit by the adder circuit. The second comparator compares the output of the adder circuit with the output of the sixth latch circuit. The logic circuit controls the seventh latch circuit in correspondence with the output of the second comparator. When the output of the sixth latch circuit falls to a level within the range of the outputs from the adder circuit, the logic circuit latches the output of the sixth circuit in the seventh latch circuit. When the output of the sixth latch circuit does not fall to such a level, the logic circuit controls the seventh latch circuit to output the previous latch value.

BRIEF DESCRIPTION OF THE DRAWINGS

The foregoing and other objects and features of the present invention now will be described in detail with reference to the accompanying drawings, in which:

FIGS. 2A and 2B show the servo byte pattern of the invention, and accompanying timing diagrams.

DETAILED DESCRIPTION OF THE PREFERRED EMBODIMENT

Figure 1:
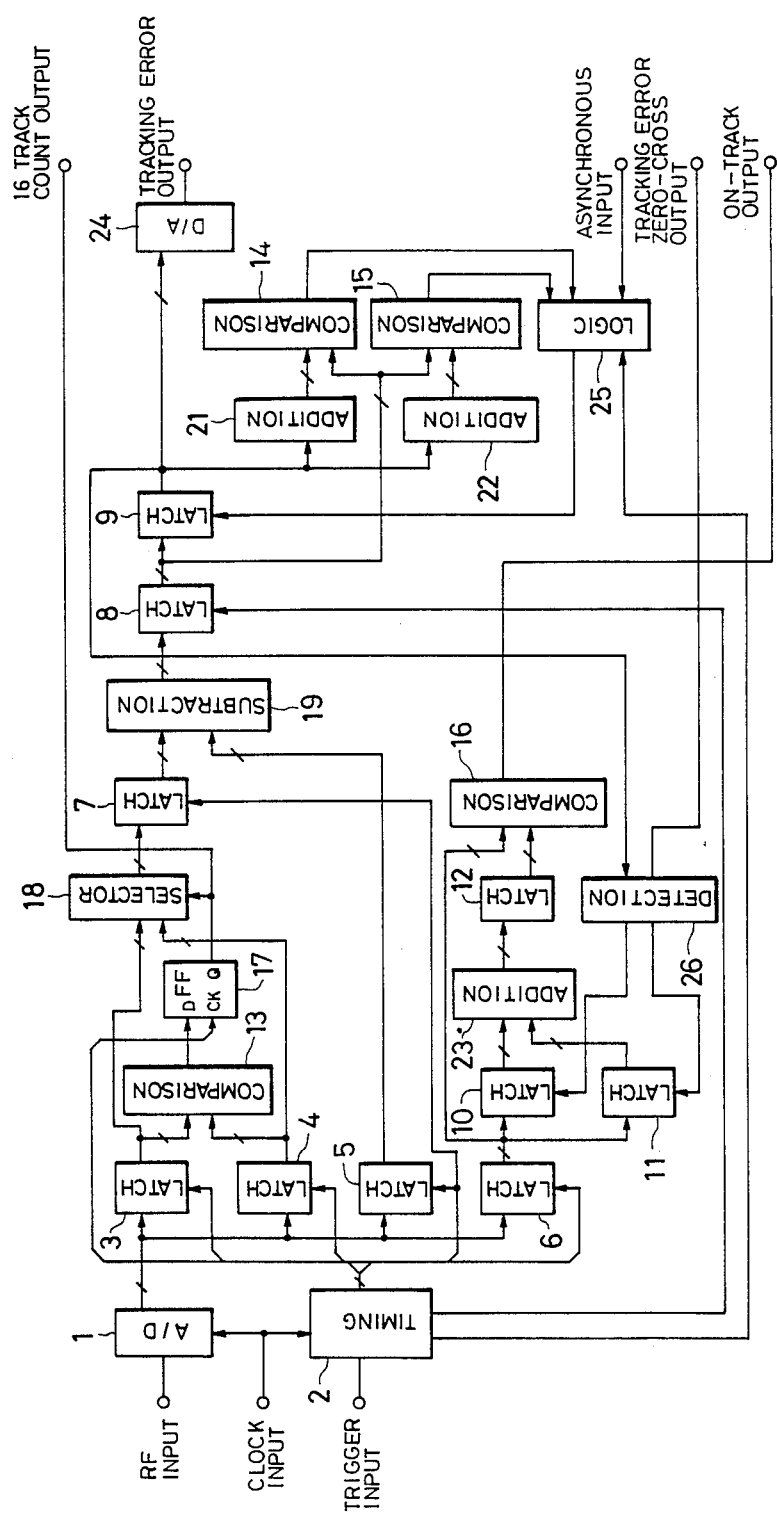
FIG. 1 is a block diagram of the tracking error signal generating circuit according to the invention.

FIG. 1 is a block diagram showing the error signal generating circuit of the present invention. An RF signal, reproduced from an optical disk or the like, is A/D converted in an A/D converter 1 in accordance with an appropriate clock signal. Digital signals outputted from the A/D converter 1 are inputted into latch circuits 3, 4, 5, and 6. A timing signal generating circuit 2 produces predetermined timing signals in synchronization with trigger signals and clock signals inputted thereto. These predetermined timing signals are supplied to each element of the tracking circuit as necessary. The latch circuits 3 to 6 are respectively supplied with timing signals corresponding to the third channel bit, the fourth channel bit, and the eighth channel bit of the first byte of the servo portion mentioned above, and the twelfth channel bit of the second byte of the servo portion. Consequently, the latch circuits 3 to 6 latch the digitals in accordance with these respective timings.

The output of the latch circuit 3 and the output of the latch circuit 4 are inputted to a comparator 13 whose output, for example, takes a high level when the output of the latch circuit 3 is higher than that of the latch circuit 4 and a low level when the output of the latch circuit 3 is lower than that of the latch circuit 4. The output of the comparator circuit 13 is inputted to a time-delay type flip-flop 17 used as a latch circuit, which then is latched at the predetermined timing.

As described above, the first wobbled pit is in the third channel bit or the fourth channel bit. Consequently, the flip-flop 17 outputs a high level signal for a period corresponding to 16 tracks in a servo block where a wobbled pit is recorded in a third channel bit, and outputs a low level signal for a period corresponding to 16 tracks in another servo block where a wobbled pits is recorded in a fourth channel bit. As a result, monitoring the output of the flip-flop 17 enables a counting of the sixteen tracks.

The output of the flip-flop 17 is supplied to selector circuit 18. When the selector circuit 18 receives a high level signal, it selects the output of the latch circuit 3 as its output, and when it receives a low level signal, it selects the output of the latch circuit 4 as its output. The output of either latch circuit 3 or 4, depending on the position of the first wobble pit, is selected by the selector circuit 18 and is latched in the latch circuit 7. The same timing signal is supplied to both the latch circuit 5 and the latch circuit 7.

The difference between digital signals latched in the latch circuits 5 and 7 is calculated in the subtraction circuit 19. Because both the latch circuit 5 and 7 are latching the digital signals produced from two wobbled pits, the subtraction circuit 19 produces digital tracking error signals. The digital tracking error signal outputted from the subtraction circuit 19 is latched in the latch circuit 8 at a predetermined timing.

Further, the output of the latch circuit 8 is latched in the latch circuit 9. The adder circuits 21 and 22 add a predetermined standard value to the output of the latch circuit 9. The comparator 14 compares the output of the latch circuit 8 (which has been latched in the latch circuit 9) with that of the adder circuit 21 and, for example, outputs a high level signal when the output of the latch circuit 8 is larger than that that of the adder circuit 21. Similarly, the comparator circuit 15 compares the output of the latch circuit 8 with that of the adder circuit 22 and outputs a high level signal when the former is smaller than the latter. Thus, a wind comparator is constructed by the comparators 14 and 15, and the adder circuits 21 and 22.

The logic circuit 25 controls the latch circuit 9 when a high level signal is supplied to the logic circuit 25 by the comparator 14 or 15, or a signal is asynchronously inputted thereto from a circuit (not shown). thereby preventing the output of the latch circuit 8 from being latched. Since the addition circuits add a predetermined quantity to the output of the latch circuit 9, a predetermined standard range thus may be defined in accordance with the points at which the comparators 14 and 15 output high level signals. Thus, the latch circuit 9 latches the output of the latch circuit 8 when the output of the latch circuit is within the predetermined standard range and outputs the latched output.

Further, the latch circuit 9 outputs the output previously latched when the output of the latch circuit 8 is out of the standard range. The digital tracking error signal to be outputted from the latch circuit 9 is D/A converted in a D/A converter 24, and the analog output is the tracking error signal.

The output of the latch circuit 9 also is inputted to a detection circuit 26. The detection circuit 26 detects an inversion (zero crossing point) of a polarity of the tracking error signal and outputs the detected signal to a circuit (not shown). When the detection circuit 26 detects a polarity inversion, it outputs a timing signal to a latch circuit (either 10 or 11), and when the next inversion is detected, the circuit 26 outputs a timing signal to the other of the two latch circuits 10 and 11. As a result, these latch circuits 10 and 11 take turns latching the output of the latch circuit 6 every time the polarity of the tracking error signal changes.

The adder circuit 23 adds the output of the latch circuit 10 to that of the latch circuit 11, and outputs the average (mean) of those two outputs. This mean value is latched in the latch circuit 12 at a predetermined timing. The latch circuit 6 latches the level at the timing of a clock pit, so that the latch circuit 12 latches the mean value of a level of the clock pit when the pickup tracks along the track centerline. The comparator 16 compares the output of the latch circuit 6 with that of the latch circuit 12 and outputs an on-track signal representing the pickup is on track when the output of the latch circuit is at least as large as that of the latch circuit 12.

As described, because the tracking error signal generating circuit of the present invention A/D converts the inputted RF signal, tracking error may be computed digitally, so that no capacitor or other sample and hold circuitry is necessary, nor is it necessary to control the offset.

What is claimed is:

1. A tracking error signal generating circuit comprising:
   conversion means (1) for converting an inputted analog radio frequency signal to a digital signal;
   timing signal generating means (2) for generating at least first through third predetermined timing signals;
   first, second and third latching means (3–5) for latching an output of said conversion means in synchronization with said first, second, and third predetermined timing signals, respectively;
   first comparator means (13) for comparing the outputs of said first and second latching means (3,4);
   fourth latching means (17) for latching an output of said first comparator means;
   selector means (18) for selecting one of the outputs of said first and second latching means in accordance with an output of said fourth latching means (17);
   subtractor means (19) for calculating a difference between respective outputs of said third latching and selector means (5,18);
   fifth latching means (8) for latching an output of said subtractor means (19);
   sixth latching means (9) for latching the output of said fifth latching means (8);
   adder means (21,22) for adding a predetermined value to an output of said sixth latching means (9);
   second comparator means (14,15) for comparing an output of said adder means (21,22) with the output of the fifth latching means (8);

logic means (25) for controlling the sixth latching means (9) in accordance with an output of said second comparator means (14,15); and conversion means (24) for converting a digital output of said sixth latching means to provide an analog tracking error output signal.

2. A tracking error signal generating circuit as claimed in claim 1, wherein said adder means and said second comparator means comprise:

a first adder (21) for adding a first predetermined standard value to said output of said sixth latching means (9);

a first comparator (14) for comparing an output of said first adder (21) and said output of said fifth latching means (8);

a second adder (22) for adding a second predetermined standard value to said output of said sixth latching means (9);

a second comparator (15) for comparing an output of said second adder (22) and said output of said fifth latching means (8);

wherein said logic means (25) controls said sixth latching means (9) in accordance with respective outputs of said first and second comparators.

3. A tracking error signal generating circuit as claimed in claim 1, wherein said logic means (25) controls said sixth latching means (9) in accordance with an asynchronous input signal.

4. A tracking error signal generating circuit as claimed in claim 1, further comprising zero crossing point detecting means (26) for detecting a zero crossing point of a polarity of said tracking error output signal and providing first and second outputs accordingly, and on-track output means (10,11,12,16,23) for outputting an on-track signal indicative of centering of a pickup on a track centerline.

5. A tracking error signal generating circuit as claimed in claim 4, wherein said on-track output means comprises:

seventh latching means (6) for latching an output of said conversion means (1) in accordance with said timing signal generator means (2);

eighth latching means (10) for latching an output of said seventh latching means (6) in accordance with said first output of said zero crossing point detecting means (26);

ninth latching means (11) for latching said output of said seventh latching means (6) in accordance with said second output of said zero crossing point detecting means (26);

second adder means (23) for adding respective outputs of said eighth and ninth latching means (10, 11) and outputting a mean value of said added respective outputs;

tenth latching means (12) for latching said mean value; and third comparator means (16) for comparing respective outputs of said seventh and tenth latching means (6,12) and providing said on-track signal.

* * * * *